United States Patent [19]

Flanagan

[11] 3,772,682

[45] Nov. 13, 1973

[54] DIGITAL CONVERSION FROM ONE PCM FORMAT TO ANOTHER

[75] Inventor: James Loton Flanagan, Warren, N.J.

[73] Assignee: Bell Telephone Laboratories, Incorporated, Murry Hill, Berkeley Heights, N.J.

[22] Filed: Apr. 19, 1972

[21] Appl. No.: 245,559

[52] U.S. Cl. .......... 340/347 DD, 235/154, 325/38 B
[51] Int. Cl. .......... H03k 13/24
[58] Field of Search .......... 340/347 DD; 332/11 D; 325/38 R, 38 A, 38 B; 179/15 A, 15 AV, 15 BW; 178/DIG. 3; 235/154

[56] References Cited

UNITED STATES PATENTS

| | | | |
|---|---|---|---|
| 3,500,441 | 3/1970 | Brolin | 325/38 B |
| 3,339,142 | 8/1967 | Varsos | 325/38 B |
| 3,526,855 | 9/1970 | McDonald | 332/11 D |
| 3,569,834 | 3/1971 | Debart | 325/38 R |
| 3,594,560 | 7/1971 | Stanley | 340/347 DD |
| 3,707,712 | 12/1972 | Deschenes | 340/347 DD |

*Primary Examiner*—Charles D. Miller
*Attorney*—W. R. Keefauver

[57] ABSTRACT

Conversion between adaptive differential PCM normally is accomplished by decoding, requantizing, and recoding. Complex operations are required and noise and other distortions are inevitably introduced. According to this invention, conversion is carried out entirely on a digital basis without decoding to baseband. The bit stream of a signal in one code format is examined logically to determine the constraints applied during its coding for the removal of signal redundancy. Redundancy is thereupon redistributed by adjusting the code word description to the degree necessary for the new format. Since no intermediate decoding is employed, no additional noise is introduced, and the resulting coded signal may be expressed with digital words to any desired accuracy.

8 Claims, 5 Drawing Figures

DIGITAL CONVERSION FROM ONE PCM FORMAT TO ANOTHER

This invention relates to digital message transmission systems and more particularly to the conversion of messages from one digital code format to another.

DESCRIPTION OF THE PRIOR ART

Differential pulse code modulation (DPCM) is a form of message coding in which an analog speech or video signal is periodically sampled to form a digital pulse train, and in which the difference between each pulse sample and a prediction of it, based on past sampled values, is quantized and coded for transmission. By using a number of quantizer levels or steps, a staircase approximation to the analog input signal is produced. Differential coding, by which redundancy is removed from the signal, can lead to a bit-rate saving equivalent to about 2 bits per sample over conventional PCM coding.

However, if the quantizer is equipped with steps of fixed size, the encoded difference signal does not always efficiently fill the quantizer. Ideally, each step should be occupied with equal probability. Furthermore, a differential coder is limited in its ability to follow rapid changes in the input signal. This inability, and the consequent coding error, is referred to as a slope overload and a coder operating in this fashion is said to be slope limited.

Slpe overload is, to some extent, avoided by adapting the quantizer to changing signal parameters. In its simplest form, an adaptive differential pulse code modulation (ADPCM) system monitors the digital output of the coder and, in response to pulse sequences indicating the magnitude of the difference signals, changes the effective step size of the quantizer. For example, when slope overload occurs, the output of the encoder is a succession of pulse groups indicating that maximum incrementation is needed. When the signal is of very low magnitude, the output pulse train typically indicates hunting between the lowest step levels of the quantizer. In either case, a control logic unit monitoring the output reacts and adjusts the effective quantizer step size. This may be done directly at the quantizer or by changing the reference levels of the quantizer and decoder. Thus, ADPCM combats the slope overload problem while at the same time retaining the advantages of DPCM coding. Consequently, the transmitted code is more efficient because it permits more signal redundancy to be removed from the transmitted data. It yields a higher quality signal for the same bit rate or, conversely, achieves a given quality at a lower bit rate.

BACKGROUND OF THE INVENTION

Thus, different forms of message coding are available, each with certain advantages over the other and each with certain disadvantages. Some messages benefit from one form of coding, some from another. Inevitably, however, as transmission systems are expanded, it becomes necessary to interconnect digital systems equipped to handle different code formats. For example, it may be desirable to transmit a conventional PCM signal by way of an ADPCM channel to achieve a favorable bit rate. Or, it may be that a DPCM channel is all that is available. Possibly, contiguous channels equipped to handle several different code formats will be encountered in transmission. Since a channel designed for one code format cannot accommodate a message coded in a different one, it is therefore necessary to convert the message from one format to another at each point of interconnection.

It may also be desirable to transform from one bit stream rate to another, e.g., from a 3-bit ADPCM format to a 4-bit DPCM format, from a 6-bit PCM to a 3-bit ADPCM format, or the like. It is also often necessary to convert from one code format to another within a single system, for example, to permit digital filtering of a message signal. Most digital filters operate on a conventional PCM format. It is therefore necessary to convert the message signal to PCM for filtering and then back again to the original format for transmission.

Heretofore, the conversion of a signal in one code format to another has required local decoding, i.e., reduction to baseband analog form, and then a recoding to the new format. For example, an ADPCM signal is decoded to a pulse amplitude modulated (PAM) signal, detected by a low-pass filter, and then requantized and coded as a DPCM signal. Obviously, this requires complex coding and decoding apparatus. It also exposes the signal to coding errors, and often introduces noise and other signal degradation.

It is therefore in accordance with this invention to pass a coded signal efficiently and gracefully from one digital format to another, without the introduction of signal degradation. An object of the invention is to change the format of a digital code directly without decoding to baseband, and to do so entirely on a digital basis.

SUMMARY OF THE INVENTION

This invention is thus concerned with the efficient conversion of a coded message signal from one digital format to another entirely on a digital basis and in a fashion that avoids the necessity of decoding to baseband. It stems from the realization that the essential difference between different predictive codes is the degree of and manner by which signal redundancy has been removed from a message signal. According to the invention, a priori knowledge of the manner and extent of redundancy removal is employed to restore and/or redistribute redundant information to the extent required to alter the message code format.

By way of example, the coding logic unit of an adaptive coding system serves to establish the extent of adjustment necessary to bring a signal and a quantizer into scale. Ordinarily, the logic unit examines the coder output bit stream for indications that the input signal is in the highest or lowest quantizer levels. It responds by scaling the signal to fit the quantizer, or by varying the quantizer step sizes to bracket the signal.

In like manner, the conversion apparatus of this invention employs a logic unit to examine an incoming bit stream to identify a sequence of signals which indicated that a scale factor adjustment was made in coding the signal. The logic unit thereupon takes this adjustment into account and develops a scale factor suitable for converting the signal to the new format. Format conversion is achieved by digitally multiplying each code word by the required scale factor, and by truncating the product word to the number of bits required for the new format. Discarded least significant bits are accumulated and carried into the new word to increase conversion accuracy.

In addition to converting from one digital format to another, the word size used in a given code format may be altered, in accordance with the invention, with or without a change in code format. Thus, for example, a 4-bit DPCM signal may be redefined as a 3-bit signal in a ADPCM format, or as a 6-bit signal in a PCM format.

Other advantages of the invention and the manner by which its objectives are attained will be better understood from the following detailed description with reference to the accompanying drawings.

DETAILED DESCRIPTION OF THE INVENTION

Since format conversion according to the invention relies for its effectiveness on a priori knowledge of the manner by which redundancy in a message signal has been altered in coding, so also, an understanding of the invention benefits from a discussion of the way in which typical digital predictive coding is accomplished.

Differential PCM is a special form of predictive quantizing and serves to quantize the difference between a sample of an analog signal and a linear prediction of it. The difference signal, sometimes called the error in prediction, typically requires fewer bits for transmission than does the quantized value of the original input sample. Further, it has been shown that by predicting around the quantizer, noise in the detected signal is the same as the quantizing noise in the error signal. Quantizing noise, therefore, does not accumulate with successive transmitter estimates of the input signal.

Figure 1:
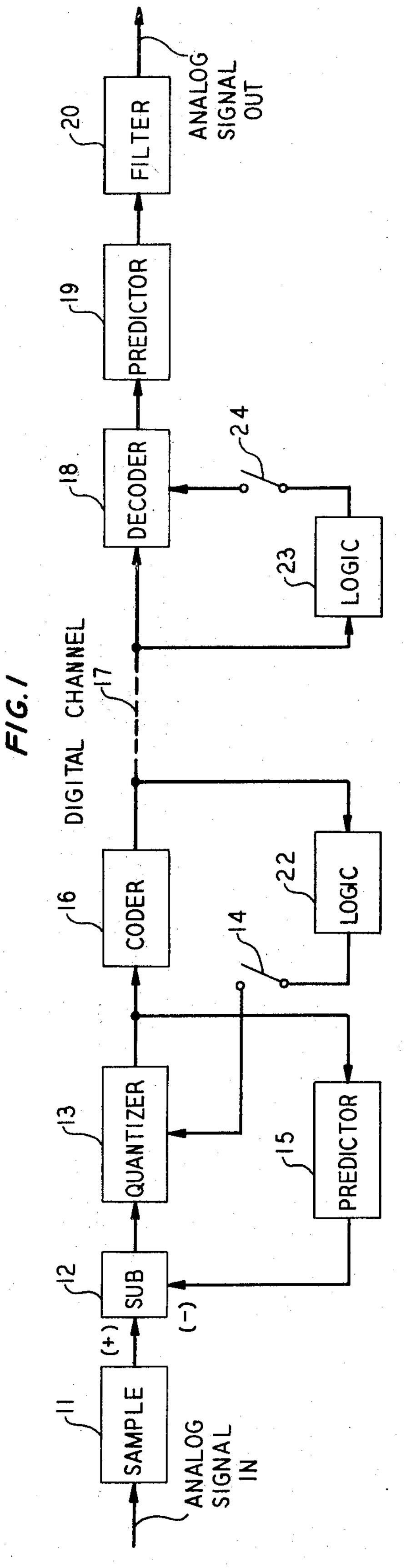
FIG. 1 depicts a conventional arrangement for digitally coding an analog signal according to known predictive quantizing concepts.

FIG. 1 illustrates a system for encoding analog message signals in either a DPCM or an ADPCM format. A message signal is sampled in unit 11, typically at a selected rate controlled by a clock or the like, and the samples are compared in subtraction network 12 to the amplitude of a prediction of the sample. The difference, or prediction error signal, is delivered to quantizer 13, typically with fixed step sizes, to establish signal samples at selected quantum levels. Quantized signals are delivered to linear predictor 15, generally an integrator, which serves to hold the quantizer output in staircase fashion. The integrator delivers a signal accumulated from past sample values, and hence a reasonable estimate of the value of an incoming signal, to subtractor 12.

Quantized signals are also applied to coder 16 wherein a suitable pulse code is prepared to identify pulse values. Coder 16 may, for example, deliver 3-bit digital words in a conventional PCM format. Coded signals are thereupon conveyed by way of digital transmission channel 17 to a receiver station at which point incoming signals are decoded in unit 18 and delivered to linear predictor 19. Predictor 19 is in all respects identical to predictor 15 at the transmitter, typically, an integration network. Incoming samples are accumulated in predictor 19, smoothed in filter 20, and delivered to an output circuit as a replica of the input message signal. Because of the differential operation of the system, fewer bits are required to specify the applied message signal than would be required without predictive quantizing.

An adaptive DPCM system employs essentially the same elements previously described but operates to adjust the effective quantizer characteristic to embrace the local difference signal, despite large scale variations. For ADPCM operation, the bit stream output of coder 16 is monitored in logic unit 22 to determine those code words that indicate the highest or lowest level occupancy of the quantizer. If the highest levels are occupied for a selected interval, indicating slope overload, the logic circuit acts to "expand" the quantizer, i.e., change the approximating step sizes to accommodate the high amplitude signal. If code words from coder 16 indicate that the lowest level of the quantizer is occupied for a specified interval, indicating a low level, the logic "contracts" the quantizer to reduce granular distortion. Such adaptation, or "companding" can be carried on either at a syllabic rate (long term) or instantaneous (short term). Companding is conventionally achieved by multiplicatively changing the reference levels of quantizer 13 at the transmitter and decoder 18 at the receiver. Thus, adaptive systems are characterized by a selective alteration of step size magnitude in response to changes in the magnitude of the applied signal.

In an ADPCM system, signals at the receiver are applied both to decoder 18 and to logic unit 23. Logic unit 23 is essentially identical to logic unit 22 at the transmitter, has access to the same bit stream as unit 22, and makes the same decisions as unit 22. Conveniently, unit 23 develops a signal (a multiplication signal) that sets the reference voltage range of decoder 18 in the conversion of incoming digital numbers to an analog signal. Thus, if incoming digital signals represent occupancy of the highest quantizer level, logic 22 at the transmitter will correspondingly adjust the range of quantizer 13. So too, logic 23 acts on decoder 18 so that a larger voltage is assigned as the analog replica of that digital signal. Similarly, if the incoming digital signal indicates occupancy of the lowest quantizer step, the logic factor applied to decoder 18 reduces the size of the analog signal assigned for that digital word.

Figure 2:
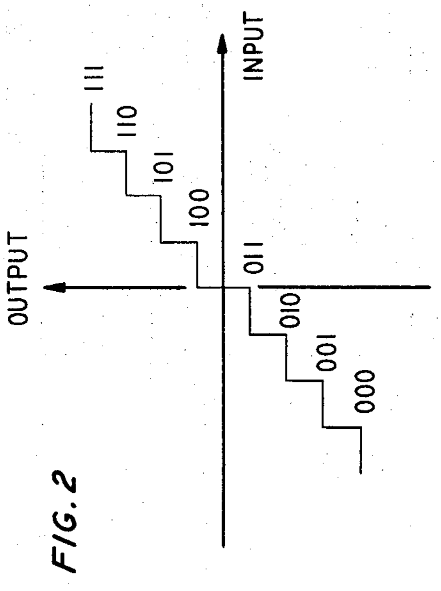
FIG. 2 illustrates a typical quantizer staircase characteristic and the 3-bit coding used to define the several quantizer levels.

Scale logic, in general, may follow any one of a variety of rules, ranging from instantaneous adaptation to syllabic adaptation with large memory. FIG. 2 illustrates a typical quantizer staircase used in an ADPCM speech coding system together with its 3-bit step code. If the binary code word is 111 or 000, indicating a large signal, a multiplication factor of greater than 1 is used to expand the effective size of the quantizer. If the code word is 100 or 011, a multiplication factor somewhat less than 1 is used to reduce the quantizer size. One logic algorithm found useful for two different sampling rates is shown in TABLE I below.

TABLE I

| Coder Output Word | Logic Output Multiplier 8KHz Sampling | 6KHz Sampling |
|---|---|---|
| 111 or 000 | 1.750 | 1.625 |
| 110 or 001 | 1.250 | 1.250 |
| 010, 011, 100, 101 | 0.875 | 0.800 |

Figure 3:
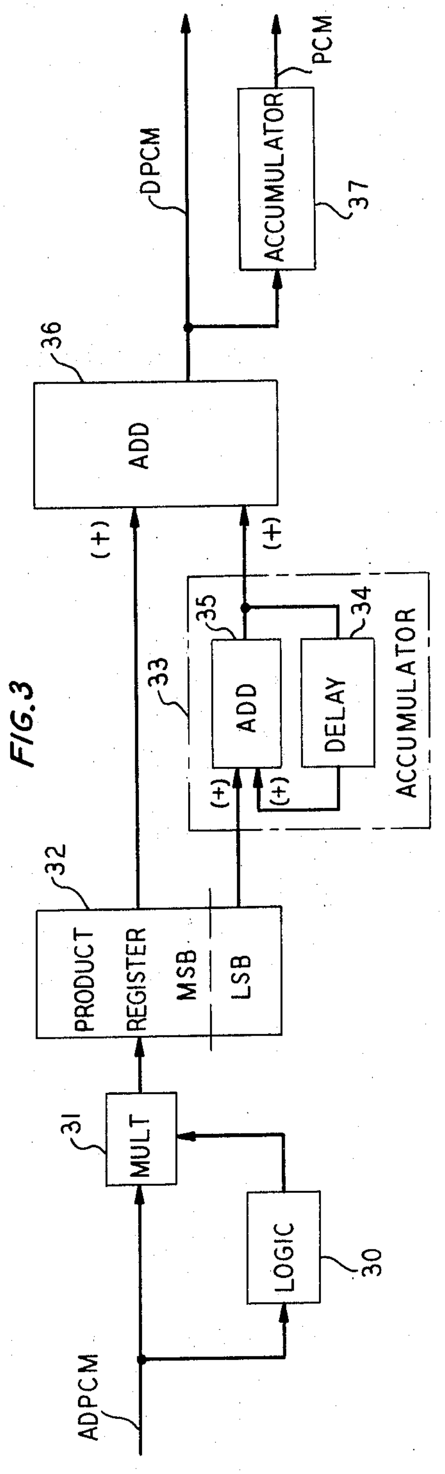
FIG. 3 is a block schematic diagram which illustrates a system for converting, in accordance with the invention, an ADPCM digital signal both to a DPCM and a PCM digital signal.

FIG. 3 illustrates an arrangement, in accordance with the invention for converting an ADPCM bit stream, as prepared for example, in the apparatus of FIG. 1, to a DPCM stream. Such an operation may be required in a transmission system at an interface with another system or within a system, for example, for digital filtering, computer actuation, or the like. By way of example, a system using a 3-bit word ADPCM input is illustrated. Incoming words are delivered to logic 30 which examines them and issues an appropriate binary multiplier factor to expand or contract the scale of the applied signal. Logic 30 thus is basically identical to logic unit 22 used in preparing the ADPCM bit stream and develops multiplication factors identical to those produced by the coding logic. Here they are used to scale the incoming signal. Digital multiplier 31, of any desired construction, responds to two *n*-bit signals (3 bits each, for example) and produces at its output a 2*n*-bit digital signal (6 bits in the example). Digital multipliers are well known and widely used in the art. By removing the expansion and contraction scale used in quantizing the ADPCM message, the ouput of multiplier 31 is a DPCM coded signal. In the example, it is expressed in 6-bit words. The 6-bit product signal is stored in register 32.

However, it may be that connecting circuits operating in a DPCM format are not equipped to handle 6-bit words. More likely, they have capacities only one or two bits greater than the ADPCM format, for example, 4-bit. In accordance with the invention, product register 32 is arranged to store product signals in an array according to their bit significance. A 4-bit signal therefore is produced by truncating the register, i.e., by reading out only the four most significant bits of the 6-bit product. If the output of register 32 is to be a 5-bit number, the five most significant bits are read out.

Although the truncation operation serves to produce a close replica of the desired signal in the new format, it is evident that truncation errors may result. Accordingly, the lowest significant bits are, instead of being discarded, delivered to accumulator 33 and returned to the output bit stream in a carry operation. Accumulator 33 serves to hold each digital code value, e.g., in unit delay 34, and add it digitally to the next following code value in adder 35. Whenever the accumulated sum totals at least one, a unit digit code value is read out, leaving any fractional part for further accumulation. Digital accumulators are well known in the art, and are conventionally used for digital carry operations.

The truncated output of register 32 is thus supplied to adder 36 together with any carry signals from unit 33. The summed digital output is in the desired DPCM signal.

If conventional PCM is the desired signal output, the DPCM signal from adder 36 is applied to accumulator 37. Unit 37 serves as a digital decoder, comparable in action to decoder 19 of the receiver illustrated in FIG. 1. Its digital output is conventional PCM, and its word size is determined, as for DPCM, by the extent of truncation of the scaled input signal and by the accuracy retained in the add of the accumulator.

Just as it is often necessary to convert from ADPCM to DPCM, it is also often necessary to convert from DPCM to ADPCM. This operation is somewhat more complex since redundancy must be removed instead of supplied in the coding, i.e., adaptive coding is required. However, in accordance with the invention, additional coding is performed on a completely digital basis and the bit stream size is selectively adjusted to match the desired ADPCM format.

Figure 4:
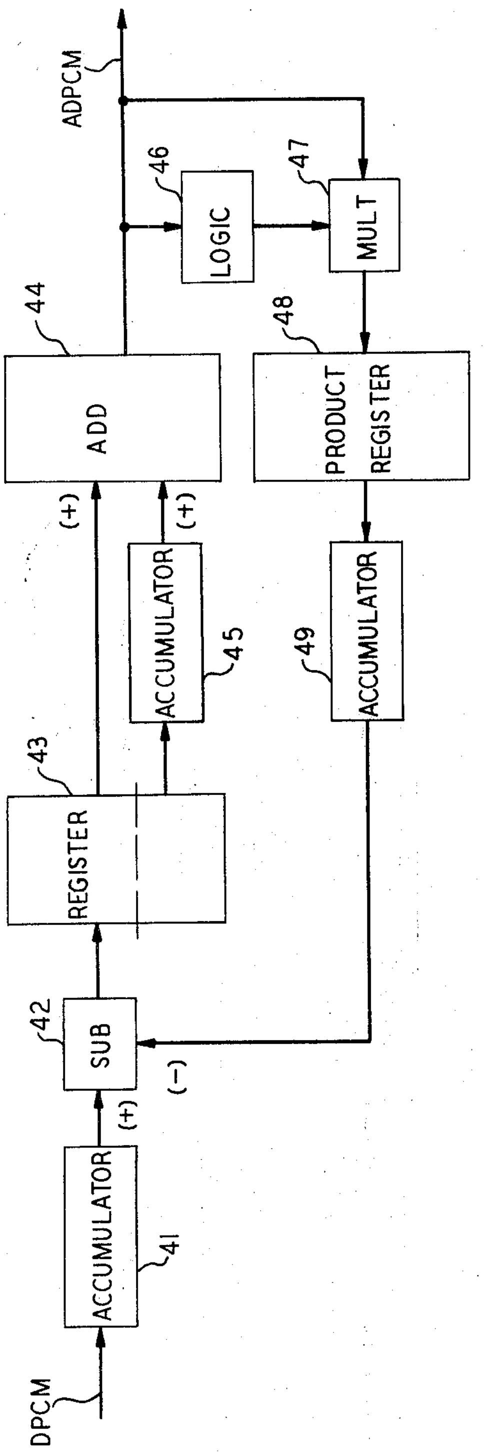
FIG. 4 is a block schematic diagram of apparatus in accordance with the invention for converting a DPCM digital signal to an ADPCM signal.

FIG. 4 illustrates an arrangement for achieving digital conversion between DPCM and ADPCM. An incoming DPCM digital signal, for example, in a 4-bit code format, is converted to PCM by means of accumulator 41. This operation is identical to that previously described with reference to unit 37 of FIG. 3. Since accumulator 41 contains an adding register, its output may be truncated to any desired accuracy, for example, to 6-bit. The output PCM signal is compared in digital subtractor 42 to a local digital word estimate of it and a digital difference signal is produced. Necessarily, the local estimate must reflect the nature and extent of companding desired for the ADPCM format. Since the coding is achieved on a digital basis and since the digital operation of multiplication alters the bit stream size, it is in accordance with the invention, to employ registers for the accumulated signals and to truncate the signals to produce the desired bit stream size. In the example, a 6-bit signal is supplied to adder 42 from accumulator 41, a 6-bit local estimate is removed from the accumulated signal, and a 6-bit difference signal is supplied to register 43. If the output ADPCM signal is, for example, to be expressed as a 3-bit signal, register 43 truncates the stored signal and delivers a sequence of 3-bit numbers to adder 44. To improve output accuracy, a carry operation is performed by storing in unit 45 the lowest significant bits, in this case the discarded three lowest significant bits, until a significant bit is accumulated and by then incrementing the signal stored in adder 44. The output of adder 44 constitutes the ADPCM signal in a digital 3-bit word form.

The local estimate of the incoming PCM signal is developed as in predictive coding by integrating a processed version of the output signal. To achieve the adaptive signal characteristic required for ADPCM, the output signal is adjusted by altering its scale, for example, in multiplier 47. The multiplication factor is established by logic unit 46, which serves to examine the output bit stream for quantizer occupancy characteristics, e.g., by means of an algorithm as described above and illustrated in TABLE I.

The scaled signal is then delivered to product register 48. If logic unit 46 develops a 3-bit multiplier signal, and if the output stream from adder 44 is a 3-bit signal, the product of multiplier 47 is a 6-bit number. Register 48 therefore must have at least 6-bit capacity. If, for some desired objective, the local estimate signal is to be developed with less than 6-bit accuracy, the digital words in register 48 may be truncated in the fashion described above. The scaled signal stored in register 48 is thereupon delivered to accumulator 49 which acts as a predictor and, consistent with the present example, is designed to retain 6-bit accuracy. The output of accumulator 49 represents a local estimate of the input PCM signal and is subtracted from the incoming PCM bit stream in subtractor 42.

Figure 5:
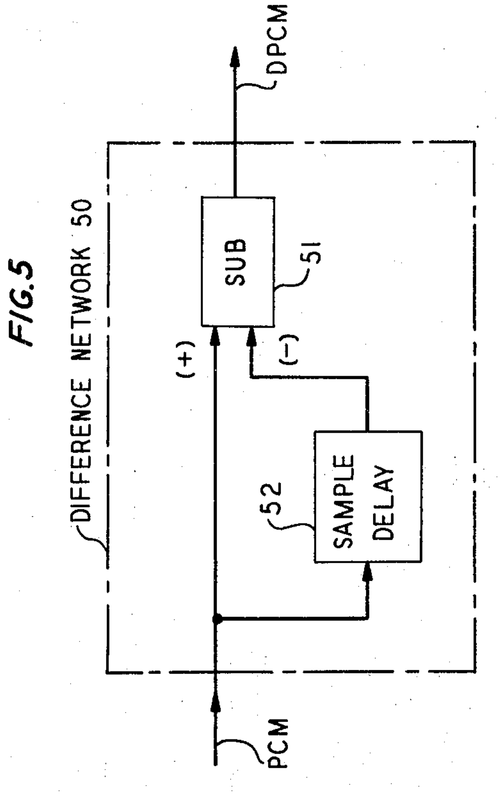
FIG. 5 is a block schematic diagram illustrating an arrangement for converting a signal in a digital PCM format to a signal in a digital DPCM format.

Since DPCM is formed by a predictive arrangement which removes that portion of each sample of a PCM signal that can be predicted on the basis of past signal history, it is necessary only to reduce an incoming PCM sample by a predictable increment to transform it to a DPCM sample. Thus, in FIG. 5, PCM samples are delivered to difference network 50, which may be of any desired construction. Typically, it employs a digital subtractor 51 and a one-sample delay unit 52. Each incoming sample is reduced, in subtractor 51 by the sample value of the immediate preceding sample. This difference constitutes a DPCM signal and, if the subtractor maintains an accuracy equal to the number of bits in the input PCM signal, the DPCM words are generated with the same length. Alternatively, and more practically, the DPCM word length may be reduced by truncation in subtractor 51.

What is claimed is:

1. Apparatus for converting an applied signal encoded in ADPCM format to a signal encoded in ADPCM format, which comprises, means responsive to that sequence of signals within said applied ADPCM signal indicative of the quantization level utilized in encoding said applied signal for developing a digital scale factor, means for digitally scaling each word of said signal in said first ADPCM format by said digital scale factor, means for accumulating said digitally scaled words, and means for truncating each of said digitally scaled words to the number of significant bits prescribed for representing said applied signal in said second ADPCM format.

2. A digital ADPCM to DPCM signal format conversion system, which comprises, scaling means responsive to that sequence of signals within an applied AMDPCM digital signal which indicates the encoding quantizer level of said applied signal, said scaling means developing a scale factor representative of the extent of companding employed in predictively coding said signal, means for digitally scaling each word of said applied signal by said factor, and means for selecting a prescribed portion of each scaled word to form words in a DPCM code format to represent said applied signal.

3. A digital ADPCM to DPCM signal format conversion system, which comprises, means for logically examining a message signal digitally coded in ADPCM format to determine constraints applied thereto during coding for the removal of redundancy from said message signal, means responsive to said determined encoding constraints for digitally multiplying said digital words by a scale factor selected to develop product digital words in which redundancy in said message signal is redistributed, and means for truncating said product words to the number of bits selected for DPCM code format to represent said message signal.

4. A digital signal format conversion system, as defined in claim 3, wherein said means for logically examining digital words in said ADPCM code format includes, means for sensing a predetermined number of consecutive identical digital words, and means for assigning a multiplier scale factor in accordance with the digital value of said sensed words.

5. A digital signal format conversion system, as defined in claim 4, wherein said scale factor is selected to be identical to the scale factor employed in representing said message signal in said first code format.

6. A digital system for converting a digital ADPCM representation of a message signal to a digital DPCM representation thereof, which comprises, logic means responsive to that sequence of signals within an applied ADPCM signal indicating the encoding quantizer level of said applied ADPCM signal, said logic means developing a digital scale factor representative of the effective quantizer characteristic employed in predictively coding said signal, means for digitally multiplying each word of said ADPCM signal by said scale factor to produce a digital product, means for selecting a prescribed number of most significant bits of each digital product word, means for recovering least significant bits of successive product words until a significant bit is accumulated, means for adding accumulated bits to said selected digital product words to produce a corrected product word, and means for utilizing said corrected digital product as a DPCM representation of said applied signal.

7. A system for converting digital ADPCM representation of a message signal to a digital DPCM representation thereof, as defined in claim 6, wherein, said DPCM representation of said applied signal is additionally accumulated on a word-by-word basis to produce a PCM representation of said applied signal.

8. A system for converting a digital DPCM representation of a message signal to a digital ADPCM representation thereof, which comprises, means for digitally accumulating consecutive DPCM code words to restore redundancy priorily removed in coding, means for developing a digital signal predictive of said restored code words based on an assigned companding characteristic, means for registering the digital difference between said restored signal and said predictive signal, and means for selectively truncating said difference signal to produce a digital ADPCM signal with a prescribed digital format.

* * * * *

UNITED STATES PATENT OFFICE

CERTIFICATE OF CORRECTION

Patent No. 3,772,682 Dated November 13, 1973

Inventor(s) James L. Flanagan

It is certified that error appears in the above-identified patent and that said Letters Patent are hereby corrected as shown below:

Claim 1, column 7, line 23, "ADPCM" should be --DPCM--,
line 29, delete "first",
line 35, delete "second",
line 36, "ADPCM" should be --DPCM--.

Claim 2, column 7, line 40, "AMDPCM" should be --ADPCM--.

Signed and sealed this 30th day of July 1974.

(SEAL)
Attest:

McCOY M. GIBSON, JR.
Attesting Officer

C. MARSHALL DANN
Commissioner of Patents

FORM PO-1050 (10-69)

USCOMM-DC 60376-P69
☆ U.S. GOVERNMENT PRINTING OFFICE 1969 O 366-334